(12) United States Patent
Nakazono et al.

(10) Patent No.: US 7,544,731 B2
(45) Date of Patent: Jun. 9, 2009

(54) RUBBER COMPOSITION FOR TIRE TREAD AND PNEUMATIC TIRE COMPRISING THE SAME

(75) Inventors: Takeo Nakazono, Kobe (JP); Shuichi Sakamoto, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 231 days.

(21) Appl. No.: 11/206,745

(22) Filed: Aug. 19, 2005

(65) Prior Publication Data

US 2006/0089451 A1 Apr. 27, 2006

(30) Foreign Application Priority Data

Oct. 26, 2004 (JP) .............................. 2004-311017

(51) Int. Cl.
*B32B 27/30* (2006.01)
(52) U.S. Cl. .................. 524/400; 524/394; 524/398; 524/399
(58) Field of Classification Search ................ 524/394, 524/398, 399, 400
See application file for complete search history.

(56) References Cited

U.S. PATENT DOCUMENTS 6,489,385 B1 * 12/2002 Fujii et al. .................. 524/186

2003/0050144 A1 3/2003 Moncrief et al.
2003/0234067 A1 12/2003 Kataoka et al.
2005/0049344 A1 * 3/2005 Vasseur ...................... 524/394

FOREIGN PATENT DOCUMENTS

| EP | 0 890 610 A-1 | 1/1999 |
|---|---|---|
| JP | 2-206629 A | 8/1990 |
| JP | 9-324077 A | 12/1997 |
| JP | 10-226736 A | 8/1998 |
| JP | 11-80433 A | 3/1999 |
| JP | 2003-82174 A | 3/2003 |
| JP | 2003-213045 A | 7/2003 |
| JP | 2003213045 | 7/2003 |
| JP | 2003-286367 A | 10/2003 |
| JP | 2004-026862 A | 1/2004 |

* cited by examiner

*Primary Examiner*—Peter D Mulcahy
(74) *Attorney, Agent, or Firm*—Birch, Stewart, Kolasch & Birch, LLP

(57) ABSTRACT

The present invention provides a rubber composition for a tire tread which can prepare a tire having improved grip properties under conditions of a high temperature, and a pneumatic tire comprising the same.

The present invention relates to the rubber composition for a tire tread containing more than 5 parts by weight of a basic antioxidant based on 100 parts by weight of the diene rubber components, wherein a metallic compound is a metallic compound comprising (1) a metallic salt of an organic carboxylic acid or (2) an inorganic metallic salt and an acid, and the pneumatic tire having a tire tread comprising the same.

3 Claims, No Drawings

RUBBER COMPOSITION FOR TIRE TREAD AND PNEUMATIC TIRE COMPRISING THE SAME

BACKGROUND OF THE INVENTION

The present invention relates to a rubber composition for a tire tread and a pneumatic tire comprising the same.

A part of a tread of a pneumatic tire had a problem of lowering grip properties under the condition of high temperature by building up heat as driving.

Conventionally, to solve those problems, compounding a resin that has a high glass transition temperature into a rubber composition for a tread tire and also compounding an imidazole compound into a rubber composition for a tread tire have been conducted, however, grip properties under the condition of a high temperature could not be improved efficiently.

Japanese Unexamined Patent Publication No. 2003-213045 disclosed a rubber composition for a tire containing an organic metallic compound such as magnesium methacrylate or zinc methacrylate was disclosed, however, there was a problem that grip properties under the condition of a high temperature could not be improved efficiently, since inhibition of crosslinking occurred by isolating methacrylic acid in kneading the organic metallic compound.

Patent reference: Japanese Unexamined Patent Publication No. 2003-213045.

SUMMARY OF THE INVENTION

The object of the present invention is to provide a rubber composition for a tire tread which can prepare a tire having improved grip properties under conditions of a high temperature, and a pneumatic tire comprising the same.

The present invention relates to a rubber composition for a tire tread comprising a diene rubber component, a basic antioxidant and a metallic compound, wherein the metallic compound is a metallic compound comprising (1) a metallic salt of an organic carboxylic acid or (2) an inorganic metallic salt and an acid, and the basic antioxidant is contained in an amount of more than 5 parts by weight based on 100 parts by weight of the diene rubber component.

The metallic salt of an organic carboxylic acid (1) preferably does not contain a multiple bond.

Also, the present invention relates to a pneumatic tire comprising a rubber composition for a tread tire.

DETAILED DESCRIPTION

A rubber composition for a tire tread of the present invention comprises a diene rubber component, a metallic compound and a basic antioxidant.

As a diene rubber, exmaples are a natural rubber (NR), a styrene-butadiene rubber (SBR), a butadiene rubber (BR), an isoprene rubber (IR), a butyl rubber, an acrylonitrile-butadiene rubber (NBR), an ethylene-propylene rubber (EPDM) and a chloroprene rubber (CR). Among those, SBR, NR and BR are preferably used and SBR is more preferably used in viewpoints of having sufficient strength and showing excellent abrasion resistance as a rubber for a tire tread.

The metallic compound is a compound comprising either (1) a metallic salt of an organic carboxylic acid or (2) a metallic salt of an inorganic carboxylic acid and an acid (hereinafter referred to as the metallic acid(2)).

Those metallic compounds contain an ionic bond. In this manner, since it is possible that loss is produced (tan D is produced) with a higher temperature or greater strain by containing an ionic bond with stronger bonding forth than a hydrogen bond (a bond of a nitrogen compound and an acid), grip properties at a high temperature can be improved. Further, since the metallic compound have a small change of a glass transition temperature, a risk of brittle fracture becomes low.

As the metallic salt of the organic carboxylic acid (1), examples are an acetate salt, an acrylate salt, a methacrylate salt and a propionate salt. Among those, since an acrylate salt and a methacrylate salt contains a double bond, the acrylate salt and a methacrylate salt correspond to the metallic salt of an organic carboxylic acid containing a multiple bond, and since a propionate salt does not contain a multiple bond such as a double bond, the propionate salt corresponds to the metallic salt of an organic carboxylic acid which does not contain a multiple bond.

Among the metallic salts of organic carboxylic acids which have a multiple bond and a methacrylate salt is preferable, and at least one kind selected from the group consisting of magnesium methacrylate and zinc methacrylate is more preferable since tan D at a high temperature can be obtained.

Also, among the metallic salts of the organic carboxylic acids, which do not contain a multiple bond such as a double bond, metallic salt of acetate is preferable and magnesium acetate is more preferable since tanD at a high temperature is obtained.

As the metallic salt of the organic carboxylic acid (1), a metallic salt of an organic carboxylic acid which does not contain a multiple bond is preferable, rather than a metallic salt of an organic carboxylic acid which contains a multiple bond. Scattering of crosslinking is inhibited and a density of crosslinking can be improved since a multiple bond is not contained.

The amount of the metallic salt of the organic carboxylic acid (1) is preferably at least 0.5 part by weight based on 100 parts by weight of a diene rubber component and more preferably 2 parts by weight. Also, the amount of the metallic salt of the organic carboxylic acid (1) is preferably at most 20 parts by weight based on 100 parts by weight of a diene rubber component, and more preferably 10 parts by weight. If the amount of the metallic salt of the organic carboxylic acid (1) is more than 20 parts by weight, tackiness tends to increase.

The metallic compound (2) comprises an inorganic metallic salt and an acid. As the inorganic metallic salt, examples are magnesium oxide and calcium oxide. Also, as the acid, examples are an organic compound containing a hydroxyl group, a carboxylic group and the like, and general acids, more concretely, an acetic acid and a propionic acid.

With respect to the metallic compound (2), the inorganic metallic salt is compounded in such a large amount not to generate an acid, but the content ratio between acid and a inorganic metallic salt can be compounded to have an equivalent electric charge. For example, the content ratio between acetic acid and a magnesium oxide can be a molar ratio of 2:1.

The amount of the inorganic metallic salt is preferably at least 0.2 part by weight based on 100 parts by weight of a diene rubber component and more preferably at least 0.7 part by weight. Also the amount of the inorganic metallic salt is preferably at most 7.5 parts by weight based on 100 parts by weight of a diene rubber component and more preferably at most 3.5 parts by weight. If the amount of the inorganic metallic salt is more than 7.5 parts by weight, tackiness tends to increase.

The amount of the acid is preferably at least 0.5 part by weight based on 100 parts by weight of the diene rubber component and more preferably at least 2 parts by weight. Also the amount of the acid is preferably at most 20 parts by weight based on 100 parts by weight of a diene rubber component and more preferably at most 10 parts by weight.

A basic antioxidant is defined as an antioxidant showing basic properties. The basic antioxidant is compounded to neutralize a high degree of acidity caused by an organic acid isolating from the organic metallic compound at kneading.

As a basic antioxidant, examples are secondary amines of aromatic series, amine-ketones, benzimidazoles, and thioureas.

As the secondary amines of aromatic series, examples are N-phenyl-N'-(1,3-dimethylbutyl)-p-phenylenediamine, phenyl-α-naphthylamine, 4,4'-bis(α,α-dimethylbenzyl)diphenylamine, alkylated diphenylamine and (p-toluenesulfonylamido)diphenylamine.

As amine-ketones, examples are a 2,2,4-trimethyl-1,2-dihydroquinoline polymer, 6-ethoxy-1,2-dihydro-2,2,4-trimethylquinoline, a condensate of aniline and ketone and a condensate of diphenylamine and acetone.

As benzimidazoles, examples are 2-mercaptobenzimidazole, 2-mercaptomethylbenzimidazole, a zinc salt of 2-mercaptobenzimidazole, a zinc salt of 2-mercaptomethylbenzimidazole As thioureas, examples are 1,3-bis(dimethylaminopropyl) thiourea and tributylthiourea.

Those basic antioxidants can be employed solely or in a combination thereof, particularly a combination use of secondary amines of aromatic series and amine-ketones is preferable and specifically a combination use of N-phenyl-N'-(1, 3-dimethylbutyl)-p-phenylenediamine and 2,2,4-trimethyl-1,2-dihydroquinoline polymer is more preferable.

The amount of the basic antioxidant is more than 5 parts by weight based on 100 parts by weight of a diene rubber component and preferably more than 7 parts by weight. If the amount of the basic antioxidant is less than 5 parts by weight, a high degree of acidity cannot be neutralized and inhibition of crosslinking occurs. Also the amount of the basic antioxidant is at most 20 parts by weight based on 100 parts by weight of a diene rubber component and preferably at most 10 parts by weight.

Other than the above mentioned rubber components, the metallic compound and the basic antioxidant, the rubber composition for a tire tread of the present invention can suitably contain a reinforcing filler such as carbon black and silica, a softener such as an aroma oil, a stearic acid, zinc oxide, and a vulcanizing agent such as sulfur and a vulcanization accelerator, which are general additives employed in tire industries.

It is general that a ordinary rubber composition for a tire tread is prepared by two kneading steps comprising the first step of kneading chemicals except for a vulcanizing agent and a vulcanization accelerator and the second step of adding the vulcanizing agent and the vulcanization accelerator into the obtained kneaded product and kneading further. Also, the rubber composition for a tire tread of the present invention can be prepared by three kneading steps described below.

In the first step, the diene rubber, the reinforcing filler, the basic antioxidant, stearic acid, zinc oxide and the like are kneaded. In the second step, the softener, the metallic compound, the basic antioxidant and the like are kneaded. In the third step, the vulcanizing agent, the vulcanizing accelerator and the like are kneaded.

In this manner, an effect of preventing an acid isolating from the metallic compound from neutralizing can be obtained by which kneading the softener, the metallic compound and the basic antioxidant is in the second step, but there is no particular limitation in the present invention.

The pneumatic tire of the present invention is prepared by a general process, employing the rubber composition for a tire tread as a tire tread. Namely, the above mentioned rubber composition is extrusion-processed into a form of a tread part of a tire in the stage of unvulcanizing and laminated on a tire molding machine by a general process to mold the unvulcanized tire. The pneumatic tire is obtained by heating-pressuring the unvulcanized tire in a vulcanizer.

Hereinafter, the present invention is explained in detail based on Examples, but the present invention is not limited thereto.

Various chemicals used in Examples are described below.

SBR: Tufdene 4350 (the amount of a bonded styrene 39%, containing 50 parts by weight of oil based on 100 parts by weight of a rubber solid content) available from ASAHI KASEI CORP.

Carbon black: DIABLACK A (N110) available from Mitsubishi Chemical Corporation

Antioxidant 6C: Santoflex 13 (N-phenyl-N'-(1,3-dimethylbutyl)-p-phenylenediamine) available from FLEXSIS CO.

Antioxidant 224: NOCRAC 224 (2,2,4-trimethyl-1,2-dihydroquinoline polymer) available from FLEXSIS CO.

Stearic acid: Stearic acid available from NOF Corporation

Zinc oxide: Zinc Oxide type 2 available from Mitsui Mining and Smelting Co., Ltd.

Aroma oil: Process X-260 available from JAPAN ENERGY CORP.

Magnesium methacrylate: SK-13 available from SANSHIN CHEMICAL INDUSTRY CO., LTD

Magnesium acetate: available from KISHIDA CHEMICAL CO., LTD

Acetic acid

Magnesium oxide

Sulfur: Powdery sulfur available from Tsurumi Chemicals Co., Ltd.

Vulcanization accelerator: Nocceler NS available from Ouchi Shinko Chemical Industrial Co., Ltd.

EXAMPLES 1 TO 5 AND COMPARATIVE EXAMPLES 1 TO 4

(Process for Preparation of a Rubber Sample of Example 1 to 2 and Comparative Example 1 to 3)

According to the amounts shown in Table 1, other than an aroma oil, magnesium methacrylate, sulfur and the vulcanization accelerator, various chemicals were base-kneaded in a BP banbury mixer, thereto were added an aroma oil, magnesium methacrylate and the antioxidant 6C and the mixture was base-kneaded for 4 minutes and discharged at a temperature of 150° C. to obtain the kneaded product. To the kneaded product were added sulfur, the vulcanization accelerator and the mixture was kneaded for 5 minutes by using an open roll. A sheet was prepared with the obtained rubber composition and rubber samples of Example 1 to 2 and Comparative Example 1 to 3 were prepared by vulcanizing with a specified mold for 12 minutes at a temperature of 170° C. Also, re-rolling was conducted in Example 2 and Comparative Example 2. Herein, re-rolling is defined that the kneaded rubber in a banbury mixer was rolled and gave stimulation by conducting heating to isolate an acid.

(Process for Preparation of Rubber Samples of Examples 3 to 5 and Comparative Example 4)

According to the amounts shown in Table 2, other than an aroma oil, magnesium methacrylate, magnesium acetate, acetic acid, magnesium oxide, sulfur and the vulcanization accelerator, various chemicals were kneaded for 3 minutes in a BP banbury mixer, thereto were added an aroma oil, magnesium methacrylate, magnesium acetate, acetic acid, magnesium oxide and an antioxidant 6C and the mixture were base-kneaded for 3 minutes and discharged at a temperature of 150° C. to obtain the kneaded product. To the above mentioned kneaded product were added sulfur and the vulcanization accelerator and the mixture was kneaded for 5 minutes by using an open roll. A sheet was prepared with the obtained rubber composition and a rubber sample of Examples 3 to 5 and Comparative Example 4 were prepared by vulcanizing with a specified mold for 12 minutes at a temperature of 170° C.

The following tests were conducted by using the obtained rubber samples.

(Degree of Crosslinking (SWELL))

SWELL was evaluated by toluene-extracting the rubber samples. The larger the measurement value is, the greater the scattering of crosslinking is, which does not mean preferable.

(Viscoelasticity)

10% of initial strain was given by using the viscoelasticity spectrometer made by Iwamoto Corporation and viscoelasticity (complex modulus E' and loss coefficient tanD) under the condition of giving 2% of dynamic strain at 100° C. was measured. The larger tanD index is, the higher the grip is, which means that grip properties is excellent.

(Tensile Test)

In accordance with JIS Tensile Test 6251, Dumbbell No. 3 sample was tested and an the index was respectively represented, regarding the index of Example 1 or Example 4 as 100. The greater M300 (stress at 300% elongation) is, the more abrasion properties becomes.

(Process for Preparation of Tires of Example 1 and Comparative Examples 1 to 2)

According to the amounts shown in Table 1, other than an aroma oil, magnesium methacrylate, sulfur and the vulcanization accelerator, various chemicals were base-kneaded for 3 minutes in a BP banbury mixer, thereto were added an aroma oil, magnesium methacrylate and the antioxidant 6C and the mixture was base-kneaded for 4 minutes and discharged at 150° C. to obtain the kneaded product. To the above mentioned kneaded product were added sulfur and the vulcanization accelerator, and the mixture was kneaded for 5 minutes by using an open roll to prepare a sheet with the obtained rubber composition and the sheet were laminated in the specified form to prepare 11×7. 10-5 size of cart tires of Example 1 and Comparative Examples 1 to 2.

(Process for Preparation of Tires of Examples 3 to 5 and Comparative Examples 4)

According to the amounts shown in Table 2, other than an aroma oil, magnesium methacrylate, magnesium acetate, acetic acid, magnesium oxide, sulfur and the vulcanization accelerator, various chemicals were base-kneaded for 3 minutes in a BP banbury mixer, thereto were added an aroma oil, magnesium methacrylate, magnesium acetate, acetic acid, magnesium oxide and the antioxidant 6C, and the mixture was base-kneaded for 4 minutes and discharged at 150° C. to obtain the kneaded product. To the above mentioned kneaded product were added, sulfur and the vulcanization accelerator, and the mixture was kneaded for 5 minutes by using an open roll to prepare a sheet with the obtained rubber composition and the sheet was laminated in the specified form to prepare 11×7. 10-5 size of cart tires of Examples 3 to 5.

The obtained cart tire was mounted on an automobile and the running evaluation was conducted.

(Grip Test)

The above mentioned tire was mounted on a cart and evaluated by driving 8 rounds of 2 km round circuit course. Tire grip feeling was evaluated, assuming that of Comparative Example 1 as 3 points according to the maximum point 5. Initial grip was measured at 1 to 4 round and the latter grip at 5 to 8 round.

(Abrasion Appearance)

The above mentioned tire was mounted on a cart and evaluated by driving 8 rounds of 2 km round circuit course. Relative evaluation was conducted, assuming appearance of the tire of Comparative Example 1 as 3 points according to 5 maximum points.

Each evaluation result is represented in Table 1 and 2.

TABLE 1

|  | Ex. | | Com. Ex. | | |
| --- | --- | --- | --- | --- | --- |
|  | 1 | 2 | 1 | 2 | 3 |
| Amount (parts by weight) | | | | | |
| SBR | 150 | 150 | 150 | 150 | 150 |
| Carbon black | 100 | 100 | 100 | 100 | 100 |
| Antioxidant 6C | 2.5 | 2.5 | 2.5 | 2.5 | 2.5 |
| Antioxidant 224 | 1.5 | 1.5 | 1.5 | 1.5 | 1.5 |
| Stearic acid | 2 | 2 | 2 | 2 | 2 |
| Zinc oxide | 4 | 4 | 4 | 4 | 4 |
| Aroma oil | 45 | 45 | 50 | 50 | 50 |
| Magnesium methacrylate | 5 | 5 | 0 | 5 | 5 |
| Antioxidant 6C | 5 | 5 | 0 | 0 | 0 |
| Sulfur | 1.2 | 1.2 | 1 | 1.2 | 1.2 |
| Vulcanization accelerator | 2.5 | 2.5 | 2.5 | 2.5 | 2.5 |
| Total amount of antioxidants (parts by weight) | 9 | 9 | 4 | 4 | 4 |
| Rerolling | — | ○ | — | — | ○ |
| Evaluation results | | | | | |
| SWELL | 225 | 224 | 223 | 230 | 256 |
| Viscoelasticity | | | | | |
| E' | 3.0 | 2.8 | 3.0 | 3.1 | 2.8 |
| tanD | 0.33 | 0.34 | 0.31 | 0.35 | 0.34 |
| Tensile test | | | | | |
| M300 | 98 | 99 | 100 | 98 | 95 |
| Running evaluation | | | | | |
| Initial grip evaluation | 3 | — | 3 | 3 | — |
| Latter grip evaluation | 3.5 | — | 3 | 3 | — |
| Abrasion appearance | 3 | — | 3 | 2.5 | — |

TABLE 2

|  | Ex. | | | Com. Ex. |
| --- | --- | --- | --- | --- |
|  | 3 | 4 | 5 | 4 |
| Amount (parts by weight) | | | | |
| SBR | 150 | 150 | 150 | 150 |
| Carbon black | 100 | 100 | 100 | 100 |
| Antioxidant 6C | 2.5 | 2.5 | 2.5 | 2.5 |
| Antioxidant 224 | 1.5 | 1.5 | 1.5 | 1.5 |
| Stearic acid | 2 | 2 | 2 | 2 |
| Zinc oxide | 4 | 4 | 4 | 4 |
| Aroma oil | 45 | 45 | 45 | 50 |
| Magnesium methacrylate | 5 | — | — | — |
| Magnesium acetate | — | 5 | — | — |
| Antioxidant 6C | 5 | 5 | 5 | — |
| Acetic acid | — | — | 5 | — |

TABLE 2-continued

|  | Ex. | | | Com. Ex. |
|---|---|---|---|---|
|  | 3 | 4 | 5 | 4 |
| Magnesium oxide | — | — | 1.5 | — |
| Sulfur | 1.2 | 1 | 1 | 1 |
| Vulcanization accelerator | 2.5 | 2.5 | 2.5 | 2.5 |
| Total amount of antioxidants (parts by weight) | 9 | 9 | 9 | 4 |
| Evaluation results | | | | |
| SWELL | 230 | 221 | 223 | 223 |
| Viscoelasticity | | | | |
| E' | 2.6 | 3.1 | 3.3 | 3.0 |
| tanD | 0.35 | 0.34 | 0.35 | 0.31 |
| Tensile test | | | | |
| M300 | 80 | 98 | 102 | 100 |
| Running evaluation | | | | |
| Initial grip evaluation | 3 | 2.5 | 2.5 | 3 |
| Latter grip evaluation | 4 | 4 | 4 | 3 |
| Abrasion appearance | 2 | 3.5 | 3.5 | 3 |

According to the present invention, inhibition of crosslinking caused by acid generated at kneading is restrained by kneading a certain amount of a particular metallic compound and a basic antioxidant, and furthermore, a pneumatic tire prepared as a tire tread from a rubber composition obtained by kneading can show excellent grip properties in an environment of a high temperature.

What is claimed is:

1. A pneumatic tire having a tire tread comprising a rubber composition which comprises diene rubber components, a basic antioxidant and a metallic compound, wherein the metallic compound comprises magnesium acetate, and the basic antioxidant is present in an amount of more than 5 parts by weight based on 100 parts by weight of the diene rubber components.

2. The pneumatic tire of claim 1, wherein the magnesium acetate is present in an amount of 0.5 to 20 parts by weight based on 100 parts by weight of the diene rubber component.

3. The pneumatic tire of claim 1, wherein the antioxidant is present in an amount of 5 to 20 parts by weight based on 100 parts by weight of the diene rubber component.

* * * * *